(12) United States Patent
Frayne et al.

(10) Patent No.: US 10,104,369 B2
(45) Date of Patent: *Oct. 16, 2018

(54) PRINTED PLANE 3D VOLUMETRIC DISPLAY

(71) Applicant: Looking Glass Factory, Inc., New York, NY (US)

(72) Inventors: Shawn Frayne, Tampa, FL (US); Shiu Pong Lee, Quarry Bay (HK); Alexis Hornstein, Raleigh, NC (US); Tung Yiu Fok, Sha Tin (HK)

(73) Assignee: Looking Glass Factory, Inc., Brooklyn, NY (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/266,039

(22) Filed: Sep. 15, 2016

(65) Prior Publication Data

US 2017/0078655 A1    Mar. 16, 2017

Related U.S. Application Data

(60) Provisional application No. 62/218,861, filed on Sep. 15, 2015, provisional application No. 62/296,283, (Continued)

(51) Int. Cl.
*H04N 13/388* (2018.01)
*H04N 13/111* (2018.01)
(Continued)

(52) U.S. Cl.
CPC ....... *H04N 13/388* (2018.05); *G02B 27/2278* (2013.01); *G02B 27/2292* (2013.01);
(Continued)

(58) Field of Classification Search
None
See application file for complete search history.

(56) References Cited

U.S. PATENT DOCUMENTS

| 5,764,317 A | 6/1998 | Sadovnik et al. |
| 6,064,423 A | 5/2000 | Geng |

(Continued)

FOREIGN PATENT DOCUMENTS

| WO | 2002042836 A1 | 5/2002 |
| WO | 2003083822 A1 | 10/2003 |
| WO | 2008111949 A3 | 11/2008 |

OTHER PUBLICATIONS

Geng et M, Volumetric 3D Display for Radiation Therapy Planning, Dec. 2008.

*Primary Examiner* — Eileen M Adams
(74) *Attorney, Agent, or Firm* — Jeffrey Schox; Thomas Gwinn

(57) ABSTRACT

A three-dimensional volumetric display includes a light source that generates a two-dimensional image output and a transparent scattering volume, coupled to the light source on a first face of the scattering volume, that scatters the image output of the light source in a direction perpendicular to the light axis of the output of the light source; where the scattering volume comprises a three-dimensional array of printed-ink scattering elements arranged in a plurality of scattering planes tilted relative to the first face of the scattering volume.

19 Claims, 13 Drawing Sheets

Related U.S. Application Data filed on Feb. 17, 2016, provisional application No. 62/312,407, filed on Mar. 23, 2016, provisional application No. 62/312,411, filed on Mar. 23, 2016.

(51) Int. Cl.
*H04N 13/302* (2018.01)
*H04N 13/324* (2018.01)
*G02B 27/22* (2018.01)
*H04N 13/39* (2018.01)

(52) U.S. Cl.
CPC ......... *H04N 13/111* (2018.05); *H04N 13/302* (2018.05); *H04N 13/324* (2018.05); *H04N 13/39* (2018.05)

(56) References Cited

U.S. PATENT DOCUMENTS

| | | |
|---|---|---|
| 6,466,185 B2 | 10/2002 | Sullivan et al. |
| 6,697,034 B2 | 2/2004 | Tashman |
| 7,023,466 B2 | 4/2006 | Favalora et al. |
| 7,098,872 B2 | 8/2006 | Geng |
| 7,182,467 B2 | 2/2007 | Liu et al. |
| 7,477,252 B2 | 1/2009 | Chun |
| 7,587,120 B2 | 9/2009 | Koo et al. |
| 7,701,441 B2 | 4/2010 | Balakrishnan et al. |
| 7,703,924 B2 | 4/2010 | Nayar |
| 7,891,815 B2 | 2/2011 | Nayar et al. |
| 7,986,407 B2 | 7/2011 | Moser et al. |
| 8,087,784 B2 | 1/2012 | Nayar et al. |
| 8,119,845 B2 | 2/2012 | Merkel et al. |
| 8,289,274 B2 | 10/2012 | Sliwa et al. |
| 8,854,423 B2 | 10/2014 | Batchko |
| 9,195,301 B2 | 11/2015 | Kurtenbach et al. |
| 9,423,682 B2 | 8/2016 | Refai et al. |
| 9,693,048 B2 | 6/2017 | Smithwick |
| 2004/0227694 A1 | 11/2004 | Sun et al. |
| 2006/0198011 A1 | 9/2006 | Seo et al. |
| 2008/0309754 A1 | 12/2008 | Nayar |
| 2008/0316201 A1 | 12/2008 | Nayar et al. |
| 2009/0179852 A1* | 7/2009 | Refai ................ G09G 3/001 345/107 |
| 2010/0157030 A1 | 6/2010 | Nayar et al. |
| 2011/0116049 A1 | 5/2011 | Nayar et al. |
| 2011/0244187 A1 | 10/2011 | Rinko |
| 2012/0274907 A1 | 11/2012 | Refai et al. |
| 2014/0103632 A1* | 4/2014 | Camus ................ D21H 251/42 283/67 |
| 2014/0376821 A1 | 12/2014 | Meir et al. |
| 2015/0029315 A1* | 1/2015 | Refai ................ H04N 13/0253 348/51 |
| 2017/0078655 A1 | 3/2017 | Frayne et al. |

* cited by examiner

Front Perspective View

Side View

PRINTED PLANE 3D VOLUMETRIC DISPLAY

CROSS-REFERENCE TO RELATED APPLICATIONS

This application claims the benefit of U.S. Provisional Application Ser. No. 62/218,861, filed on Sep. 15, 2015, which is incorporated in its entirety by this reference.

This application claims the benefit of U.S. Provisional Application Ser. No. 62/296,283, filed on Feb. 17, 2016, which is incorporated in its entirety by this reference.

This application claims the benefit of U.S. Provisional Application Ser. No. 62/312,407, filed on Mar. 23, 2016, which is incorporated in its entirety by this reference.

This application claims the benefit of U.S. Provisional Application Ser. No. 62/312,411, filed on Mar. 23, 2016, which is incorporated in its entirety by this reference.

TECHNICAL FIELD

This invention relates generally to the image display field, and more specifically to new and useful volumetric displays in the image display field.

BACKGROUND

Image displays are an integral part of modern life. From televisions to monitors to smartphone and tablet screens, image displays provide users with the ability to view and interact with information presented in a variety of forms.

Developments in the image display field have enabled displays to provide a three-dimensional image viewing experience. Allowing users to view images in 3D results in a higher degree of realism in viewing as well as the opportunity to perceive additional information over a similar image displayed in two-dimensions.

Unfortunately, typical 3D displays (e.g., 3D TVs) are limited by the perspective they present to users; typically, all users of such displays are forced to see a 3D scene through the same perspective unless multiple displays are present. Further, typical 3D displays often require the use of glasses.

Volumetric displays enable multiple users to view the same 3D scene from multiple angles with a single display; further, volumetric displays enable 3D image data to occupy real 3D space. This capability enables 3D image information to be shared and manipulated in a manner not possible with other 3D image display systems.

Despite these advantages over conventional image display systems, volumetric displays are often limited by complexity and/or cost. Thus, there is a need in the image display field to create 3D volumetric displays. This invention provides such new and useful displays.

DESCRIPTION OF THE INVENTION EMBODIMENTS

The following description of the invention embodiments of the invention is not intended to limit the invention to these invention embodiments, but rather to enable any person skilled in the art to make and use this invention.

Figure 1:
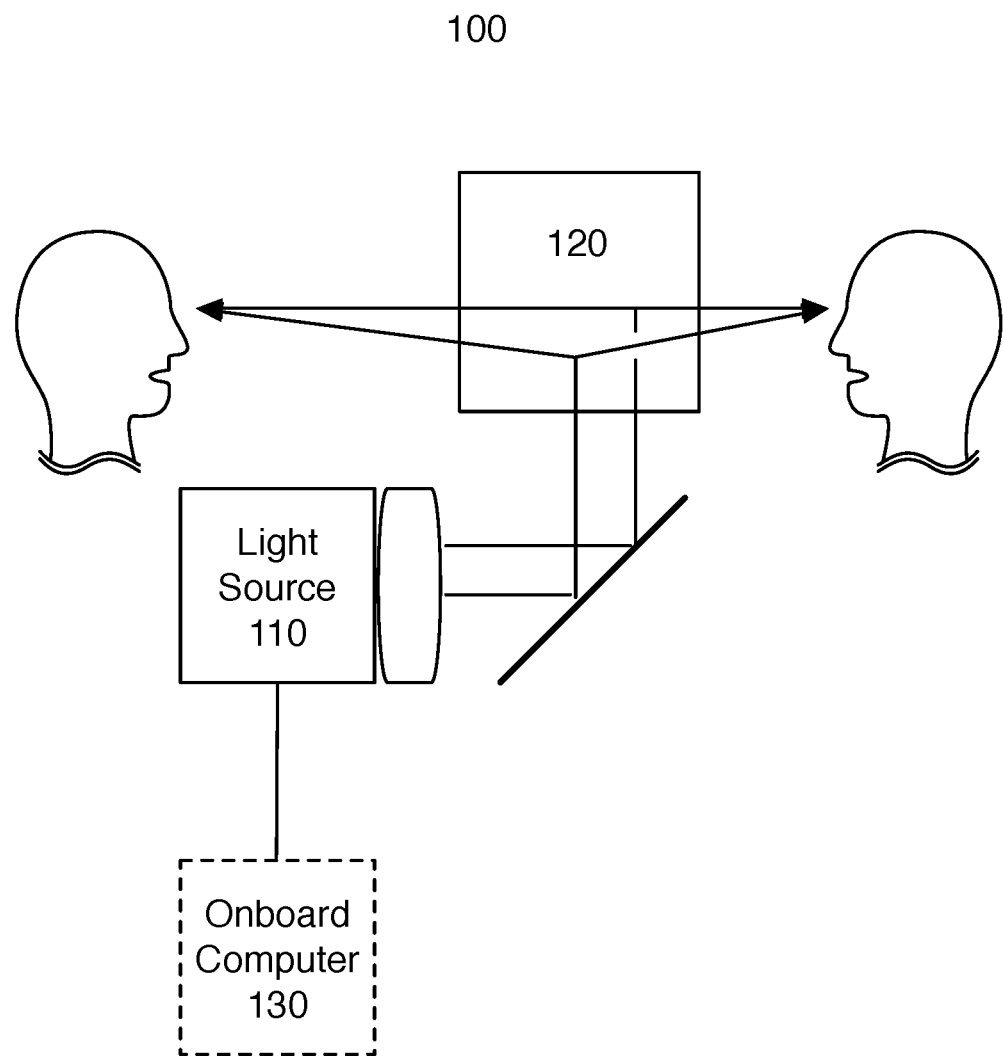
FIG. 1 is a diagram view of a system of an invention embodiment.

A 3D volumetric display 100 includes a light source 110 and a scattering volume 120, as shown in FIG. 1. The display 100 may additionally include an onboard computer 130.

The display 100 functions to enable viewers to see three-dimensional image data from multiple perspectives at the same time. The light source 110 preferably generates light based on three-dimensional image data transmitted to or generated by the display 100 and projects or otherwise transmits said light to the scattering volume 120, which transforms the transmitted light into an appropriate format for viewing. For most types of volumetric displays, this is a complex process involving the correlation of three dimensional image data (which may be discrete surface models, voxel models, or any other suitable type of image data having three-dimensional characteristics) to the voxels (or other display units) of the volumetric display.

If the display 100 includes an onboard computer 130, the onboard computer 130 may convert or provide assistance in converting image data transmitted to the display 100 into an ideal format for projection by the light source no. Additionally or alternatively, computers external to the system 100 may be used to perform part or all of image processing.

The light source 110 functions to generate images (i.e., light rays generated from image data) and transmit them to the scattering volume 120 for display.

The light source 110 is preferably a planar two-dimensional display comprising a set of individually addressable pixels, but may additionally or alternatively be any suitable display. For example, the light source no may comprise one or more movable light sources; e.g., a laser that may be scanned across a set of positions to simulate the appearance of multiple light sources (i.e., display multiplexing).

The light source 110 is preferably an RGB color light source (e.g., each pixel includes red, green, and blue subpixels) but may additionally or alternatively be a substantially monochromatic light source or any other light source (e.g., a white light source).

The light source 110 is preferably a projector or projector light engine (e.g., DLP, laser, LCoS, and/or LCD projector) but may additionally or alternatively be any suitable display (e.g., an LCD monitor/TV display, an OLED display, etc.). In one variation of an invention embodiment, the light source 110 includes a liquid crystal panel with a collimated backlight (noting that standard LCDs may not have such a collimated backlight).

The display 100 preferably includes a single light source 110, but may additionally or alternatively include multiple light sources 110. The use of multiple light sources 110 is discussed in more detail in the sections describing the scattering volume 120.

The light source 110 preferably includes optical elements (e.g., lenses, mirrors, waveguides) that function to couple light into the scattering volume 120. For example, the light source 110 may include a mirror positioned at 45 degrees relative to the light source 110 output (resulting in a 90-degree redirection of light source output). As another example, the light source 110 may include a collimating lens designed to increase collimating of the light source 110 output. As a third example, the light source 110 may include a lens designed to scale (or otherwise distort) light source 110 output (e.g., reduce in size or increase in size). Such a lens may scale light source 110 output uniformly (e.g., 2× decrease in both image dimensions) or non-uniformly (e.g., no decrease in first image dimension, 4× decrease in other image dimension). As a fourth example, the light source 110 may include a lens that manipulates the focal plane of the viewed image; such a lens may be tunable (allowing depth of field to be swept). If such a lens were tunable at a high rate, this may provide an expanded perceived depth of field to a viewer.

Figure 2A:
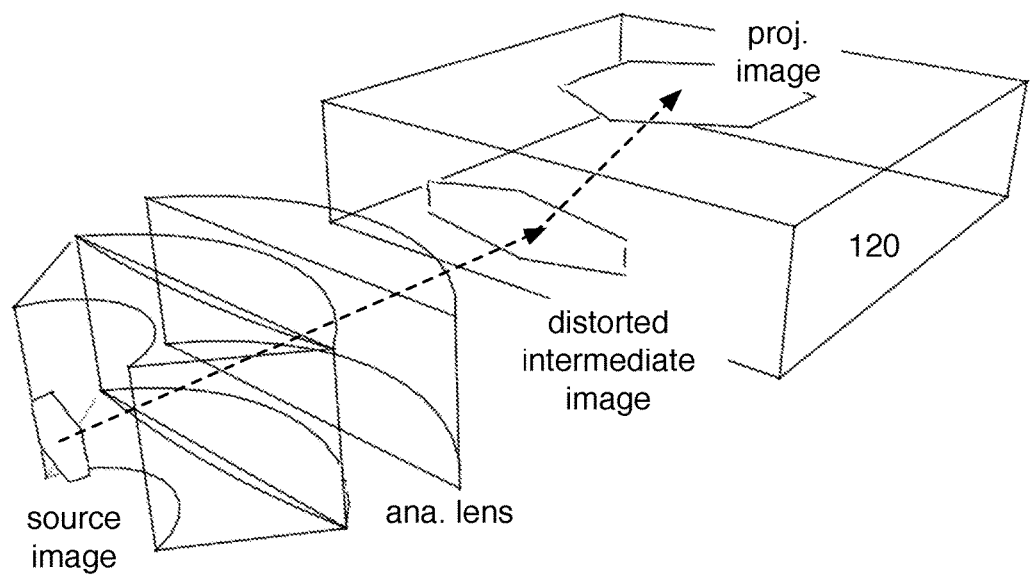
FIG. 2A is a perspective view of anamorphic lens compression of a system of an invention embodiment.
Figure 2B:
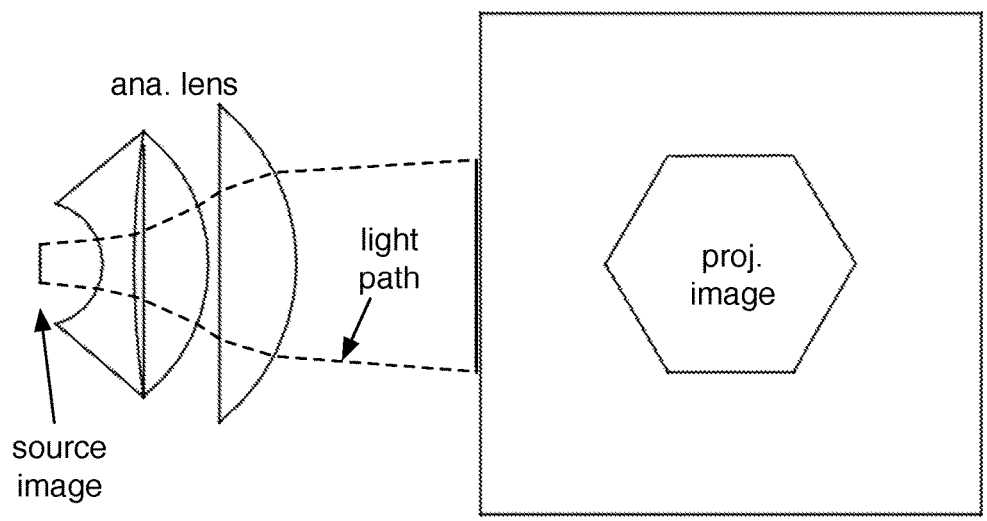
FIG. 2B is a top-down view of anamorphic lens compression of a system of an invention embodiment.

In one implementation of an invention embodiment, the light source 110 includes an anamorphic lens that spatially compresses the light output of the light source along a single axis perpendicular to the optical axis of the light source 110, as shown in FIG. 2A (perspective view) and FIG. 2B (top-down view). The anamorphic lens may be any suitable lens capable of scaling an image from the light source anisotropically (e.g., a three-element cylindrical lens). In this implementation, the scattering volume 120 preferably expands the distorted intermediate image produced by the anamorphic lens, restoring the original aspect ratio of the source image prior to scattering the image. In this implementation, pixel compression enables either higher resolution per image slice (discussed in more detail later), more image slices per a given height resolution, or an intermediate combination of these two.

Note that while anamorphic lenses have been used in prior art volumetric displays, such prior art implementations use the anamorphic lens to either increase resolution of a volumetric image or to generate images that appear different from different angles (e.g., via use of a lenticular lens array). In particular, note that these uses do not involve a scattering volume 120 that distorts the image produced by the anamorphic lens to restore the original aspect ratio of the image (prior to the anamorphic lens). While the anamorphic lens of the light source 110 may alternatively be used for any purpose, it is preferably paired with a scattering volume 120 that restores the original aspect ratio (or otherwise performs scale distortion). This is discussed in more detail in the sections covering the scattering volume 120.

The light source 110 may additionally or alternatively include any passive or active optical elements to prepare light for the scattering volume 120 or for any other purpose. For example, the light source 110 may include filters or splitters.

The scattering volume 120 functions to scatter light emitted by the light source 110 in such a manner that the scattered light forms a three-dimensional image viewable by multiple individuals at multiple perspectives substantially simultaneously.

Figure 3A:
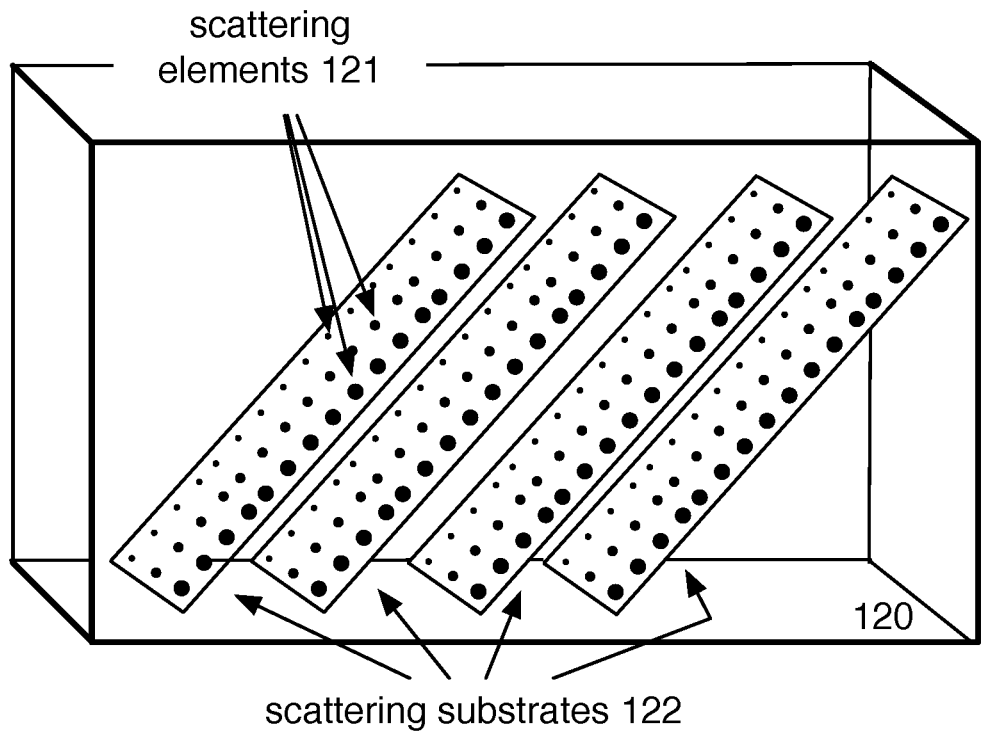
FIGS. 3A and 3B are diagram views of a scattering volume of a system of an invention embodiment.
Figure 3B:
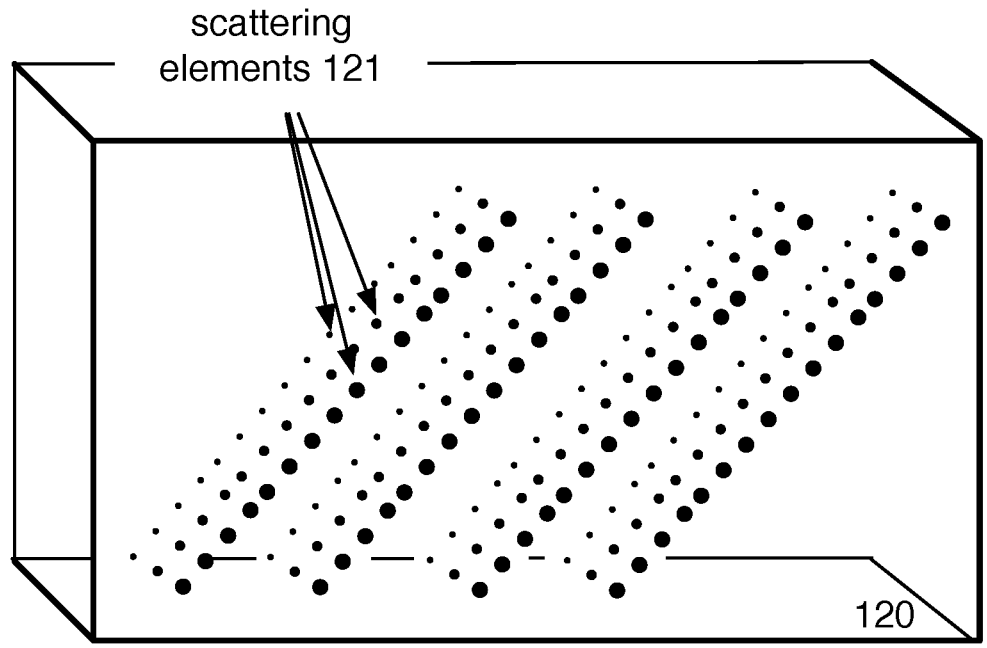

The scattering volume 120 preferably includes sets of scattering elements 121 arranged on scattering substrates 122 disposed within the volume 120, as shown in FIG. 3A. Additionally or alternatively, the scattering volume 120 may comprise scattering elements 121 disposed within a solid substrate (and not arranged on a set of scattering substrates 122), as shown in FIG. 3B, suspended or otherwise positioned (e.g., without use of a solid substrate). For example, the scattering volume 120 may comprise a volume filled with fog or other air-suspended particles (e.g., glycol vapor, atomized mineral oil).

The scattering elements 121 function to scatter light emitted by the light source 110 in such a manner that light scattered by a scattering element 121 appears to have originated (from a viewer's perspective) from the scattering element 121. By arranging scattering elements 121 in three-dimensional space, a three-dimensional image may be formed; each scattering element 121 may represent a scattering point/area similar to one that may be found on a real object (as opposed to an image projected within the scattering volume 120).

Scattering elements 121 may take a variety of forms. In a first implementation of an invention embodiment, scattering elements are formed by printing or otherwise depositing discontinuous regions of low-opacity ink upon a surface of a scattering substrate 122. In a second implementation of an invention embodiment, scattering elements 121 are cavities etched into a scattering substrate 122 or otherwise within the volume 120 (this may be alternatively phrased as a volume with a relative index of approximately 1 and/or an air containing volume if the volume is filled with air; note that here "volume" refers to the scattering element 121 and not the scattering volume 120). Additionally or alternatively, scattering elements 121 may be formed in any manner that results in a change of index of refraction within the scattering volume 120. For example, a scattering element 121 may have a solid/liquid region of some index $n_2$ within a scattering volume 120 substantially having an index $n_1$ (e.g., enabled by metallic nanoparticles or quantum dots embedded in the volume 120).

Scattering elements 121 may take any shape or form. For example, scattering elements 121 may be conical volumes, rectangular prismatic volumes, irregular volumes and/or spherical volumes. In the case of printed scattering elements 121, the shape of the scattering element may be determined by printing methods, for instance (other potential factors may include the shape and surface of the scattering substrates 122, surface treatments, etc.)

The shape and form of the scattering elements 121, as well as their orientation relative to light originating from the light source 110, may determine the scattering direction of light incident upon the scattering elements 121. For example, light may be scattered isotropically or anisotropically by scattering elements 121.

The surface of the volume defining a scattering element 121 may additionally play an important role in how light is scattered. Scattering elements 121 may be smooth (which may result in more specular reflection) or textured (which may result in more diffuse reflection). Further, scattering element 121 surfaces may be coated (e.g., with an anti-reflective coating, with a fluorescent coating, with a metallic coating, etc.) to further adjust the light scattering properties of the scattering elements 121.

The scattering properties of scattering elements 121 may be dependent on a number of characteristics of light emitted by the light source 110. As previously mentioned, the position and orientation of a scattering element 121 may determine how light is scattered by a scattering element 121. Additionally or alternatively, scattering properties may be affected by light frequency and/or light polarization. For example, a scattering element 121 may scatter light of one polarization in a first direction, while the same element 121 may scatter light of another polarization in a second direction. As another example, a scattering element 121 comprising a metallic nanoparticle may scatter light selectively based on frequency (e.g., scattering light of a narrow frequency band while not affecting light outside that band). Scattering elements 121 may additionally or alternatively be affected by other environmental variables; e.g., temperature, pressure applied to the scattering volume 120 (e.g., if the volume 120 contains piezoelectric material), applied electric field, applied magnetic field, etc.

In a variation of an invention embodiment, scattering elements 121 are coated with or otherwise comprise fluorescent material (e.g., printed using fluorescent ink), such that when light above a certain threshold frequency impinges upon the elements 121, the scattering elements 121 fluoresce at some particular frequency (or set of frequencies). Scattering elements 121 may be coated partially with fluorescent material (e.g., to provide directionality for light emitted by the fluorescing elements 121).

In a first implementation of an invention embodiment, the scattering elements 121 are preferably printed upon scattering substrates 122. In this implementation (henceforth referred to as a printed implementation), the scattering elements 121 are preferably printed on a scattering substrate using a subtractive process; e.g., a layer of ink is deposited upon a surface of a scattering substrate 122, and ink is selectively removed from the surface of the scattering substrate 122 until a desired pattern of scattering elements 121 is exposed. Alternatively, the scattering elements 121 may be printed using an additive process; e.g., ink is deposited on the surface of a scattering element in places where scattering elements 121 are desired and not in places where ink is not intended to be. The scattering elements 121 may additionally or alternatively be deposited or otherwise fabricated using any process. Some examples of processes that may be used to deposit scattering elements 121 include letterpress printing, offset printing, gravure printing, flexographic printing, dye-sublimation printing, inkjet printing, laser printing, pad printing, relief printing, screen printing, intaglio, thermal printing, electron beam deposition, ion beam deposition, atomic layer deposition (ALD), chemical vapor deposition (CVD), physical vapor deposition (PVD), sputtering, thermal evaporation, electron beam evaporation, and electroplating.

In the printed implementation, the deposited ink may be any substance (e.g., organic polymer, metal, inorganic compound). In one example implementation, the deposited ink is a white-colored UV-curable polymer.

In the printed implementation, the scattering elements 121 may be of any shape and volume, as previously described. The ink deposition process (or subsequent processing of the scattering elements 121) may dictate, in part, the shape of the of the scattering elements 121. For example, a scattering element 121 with a two-dimensional profile in the plane of the scattering substrate 122 (e.g., a circle) may have varying characteristics in the axis perpendicular to the surface of the scattering substrate (e.g., the circle may correspond to a dome-shaped element 121, a cylindrical element 121, etc.). Likewise, the scattering elements 121 may have any surface properties, as previously discussed.

In the printed implementation, the scattering elements 121 preferably allow substantial transmission of light (i.e., they are low-opacity), but may additionally or alternatively allow any amount (including none) of light transmission. The scattering elements 121 may achieve transmission of light in any manner; for example, the elements 121 may be formed by a thin deposition of an ink that is substantially opaque, but only at thickness substantially greater than the deposition thickness. As a second example, the elements 121 may be formed of an ink that is substantially transparent or translucent even at high thicknesses (e.g., greater than 1 cm). As a third example, the elements 121 may be formed using halftoning or a similar process wherein multiple inks of different opacities (e.g., one opaque and one transparent) are alternated in a pattern to give the effect of uniform low-opacity to the human eye.

In a second implementation of an invention embodiment, the scattering elements 121 are preferably formed by creating cavities in a solid material (e.g., the material of a scattering substrate 122, or the material of the scattering volume 120 if there are no distinct scattering substrates 122). In this implementation (henceforth referred to as the engraved implementation), scattering elements 121 may be formed in any manner; e.g., via laser subsurface engraving. Subsurface laser engraving may be performed, for instance, by a focused laser impinging on a face of the scattering volume 120 (the light axis normal to the face), where the focus of the laser determines the engraving location. Note that if scattering elements 121 are formed using subsurface engraving, scattering elements 121 may be formed using multiple passes (with each pass resulting in subsurface engraving at the same position or at nearby positions). With single-pass subsurface induced damage, there is typically strong scattering from 2 directions. More uniform scattering may be achieved through all scattering planes of a 3D scattering volume 120 by performing three laser-induced engraving passes, each pass through the two lasers doing the engraving at a 90/90 degree rotation from the previous pass (e.g., rotating 90 degrees in one rotational axis and 90 degrees in a second rotational axis, where these two rotational axes are orthogonal to each other and to the light axis of the subsurface engraving laser). This process results in groups of three scattering elements 120 located near each other (or at the same location) by way of 3 orientations of the scattering volume 120 in the laser etching step. These orientations are preferably orthogonal but may alternatively be related to each other in any manner. In one example, the three orientations correspond to the orientations of faces of the scattering volume 120. In this example, the three scattering elements may scatter light out of each face, resulting in a perception of omni-directional scattering (despite having individually directional scattering elements). Note that is a technique for creating subvoxel groups (described in more detail in later sections).

In the engraved implementation (similar to the printed implementation), the scattering elements 121 may be of any shape and volume, as previously described. The cavity formation process may dictate, in part, the shape of the of the scattering elements 121. For example, a scattering element 121 with a two-dimensional profile in the plane of the scattering substrate 122 or scattering volume 120 (e.g., a circle) may have varying characteristics in the axis perpendicular to the surface of the scattering substrate (e.g., the circle may correspond to a dome-shaped element 121, a cylindrical element 121, etc.). Likewise, the scattering elements 121 may have any surface properties, as previously discussed.

The scattering substrates 122, if present, function to provide surfaces for the scattering elements 121 to be printed or otherwise created. The scattering substrates 122 may be formed of any solid material. The scattering substrates 122 are preferably substantially transparent, but may additionally or alternatively have any optical properties.

Scattering elements 121 are preferably disposed upon one or more surfaces of the scattering substrates 122, but may additionally or alternatively be positioned anywhere within the scattering volume 120 (e.g., inside scattering substrates 121 as opposed to on the surface, inside a volume 120 not containing substrates 122). For example, a scattering element 121 may be printed upon one or both sides of a polymer sheet substrate 122.

In a variation of an invention embodiment, substrates 122 or volumes 120 may be processed (before, during, or after element 121 deposition) to enhance or modify scattering for elements 121. For example, scattering elements 121 may be printed into grooves, pockets, domes, pyramids etc. etched, deposited, or otherwise shaped on the surface of a scattering substrate 122. As another example, scattering substrates 122 may be coated with anti-reflective coatings to modify how light enters and/or exits the substrates 122.

In a variation of an invention embodiment, substrates 122 may be clad, sandwiched, and/or otherwise coupled to 'carrier substrates' (e.g., a scattering substrate having scattering elements on its surfaces may be coupled to carrier substrates on both sides of the substrate 122).

Scattering elements 121 are preferably arranged upon one or more surfaces of a scattering substrate 122 (or otherwise within a scattering volume 120) in a geometric pattern, but may additionally or alternatively be arranged in any manner.

Similar to scattering elements 121, scattering substrates 122 may have any shape and/or surface qualities. In one example embodiment, scattering substrates 121 are thin polymer sheets (e.g., thinner than 1 mm). In a second example embodiment, scattering substrates 121 are thicker trapezoidal prisms (which may, for example, be injection molded or machined). The scattering substrates 121 of a volume 120 may be identical (e.g., the scattering volume 120 may include four identical polymer sheets) or may alternatively be non-identical (e.g., the scattering volume 120 contains a set of trapezoidal prisms with optically complementary shapes, discussed in detail in later sections). Likewise, the pattern or presence of elements 121 on a substrate 122 may be identical or non-identical to the pattern of presence of elements 121 on another substrate 122.

The scattering substrates 122 are preferably mounted within the scattering volume 120, but may additionally or alternatively be positioned within the scattering volume 120 in any manner. For example, the scattering volume 120 may comprise a set of scattering substrates adhered together (without additional supporting material).

As previously mentioned, the scattering elements 121 are preferably arranged in a geometric pattern on the substrates 122. This pattern, along with the shape and position of the scattering substrates 122 within the scattering volume 120 (and the optical properties of the scattering elements 121 and substrates 122, the substrate of the scattering volume 120, etc.), encodes a relationship between pixels (or other two-dimensional areas) of the light source 110 and scattering elements 121.

In one implementation of an invention embodiment, scattering elements 121 may be encoded 1:1 with light source 110 pixels (i.e., each scattering element 121 corresponds to a pixel of the light source no). Alternatively, this may be stated as a 1:1 voxel:pixel relationship.

Additionally or alternatively, multiple scattering elements 121 may be associated with a single light source 110 pixel. In one implementation of an invention embodiment, several scattering elements 121 are positioned to scatter light from a single light source 110 pixel. These scattering elements 121 may be grouped closely; in such a case, they may be referred to as subvoxels. Subvoxels may be grouped into voxels for many reasons; for example, each subvoxel of a voxel may have different frequency response (similar to how each pixel of the light source 110 may include red, green, and blue subpixels). As another example, each subvoxel may have different scattering properties (e.g., four subvoxels with 90 degree scattering angles are oriented to provide 360 degree scattering for a light source 110 pixel). Note that a group of subvoxels corresponding to a voxel may be referred to as a voxel group.

The spacing between voxels/voxel groups is preferably substantially greater than the spacing between subvoxels/scattering elements 121 within a voxel group. For example, the minimum spacing of voxel groups may be more than twice (or any factor) the maximum spacing of subvoxels within a voxel group.

Alternatively, multiple scattering elements 121 associated with a pixel need not necessarily be grouped closely (i.e., they may not serve as subvoxels). For example, scattering elements 121 may be positioned within the path of a ray emitted by the light source 110; if a first element 121 transmits some of the light, that transmitted light may be scattered by additional elements 121 within the path even if they are not necessarily close to each other in space.

Additionally or alternatively, multiple pixels of the light source 110 may correspond to a single scattering element 121. This may be of particular interest in cases where the pixel size is smaller than the size of the scattering element 121.

As previously stated, scattering elements 121 are preferably disposed within the scattering volume 120 in a geometric pattern (e.g., according to a three-dimensional rectangular grid). Alternatively, scattering elements 121 may be arranged in any manner.

The scattering volume 120 is preferably a transparent solid (including scattering elements 121 and substrates 122) but may additionally or alternatively have any opacity and be made of any material.

The scattering volume 120 is preferably a rectangular prism, but may additionally or alternatively be any shape or form.

The scattering volume 120 may be formed by any method. In one example embodiment, the scattering volume 120 is a transparent hollow rectangular volume. In this embodiment, the scattering substrates 122 are placed within the volume 120. The scattering substrates 122 preferably have an index of refraction similar to the scattering volume 120, and further, the hollow space of the volume 120 not occupied by the substrates 122 is preferably filled with an index-matching material (e.g., a liquid, a resin, etc. having a similar index of refraction to that of the substrates 122 and/or the rest of the volume 120); e.g., to reduce reflection at interfaces within the volume 120. Alternatively, the scattering volume 120 may have any suitable properties.

In a variation of an invention embodiment, the scattering substrates 122 have a different index of refraction than the material surrounding the substrates 122. For example, the scattering substrates 122 may have a higher index of refraction than a surrounding fluid, enabling the substrates 122 to serve as a waveguide for light entering the scattering volume 120.

Figure 4:
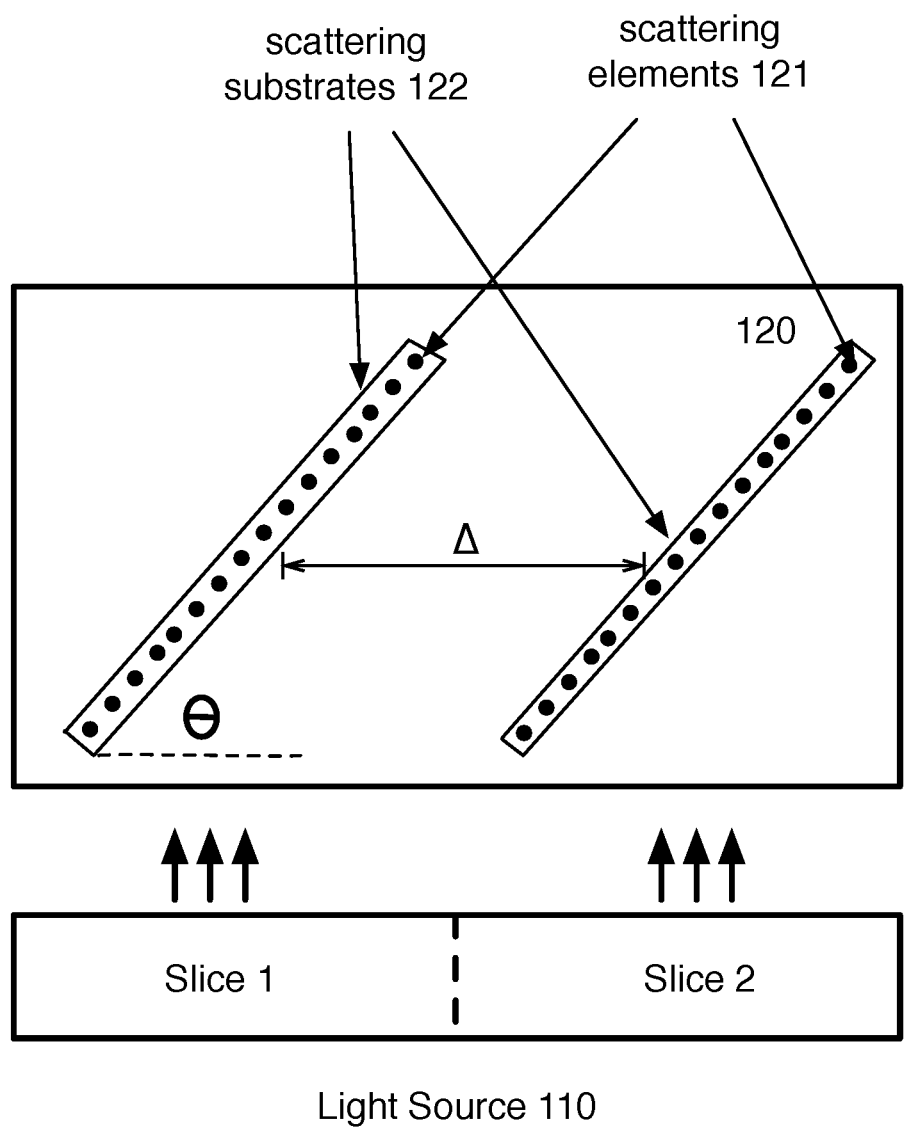
FIG. 4 is a diagram view of a system of an invention embodiment.

In a first implementation of an invention embodiment, the scattering substrates 122 are thin sheets arranged in a tilted planar configuration and scattering elements 121 are arranged in a rectangular grid pattern on one surface of the substrates 122, as shown in FIG. 3A (which shows four tilted planes). In this implementation, images projected by the light source are preferably grouped into image "slices" corresponding to the position of each tilted plane. In one implementation of an invention embodiment, each slice is transmitted by a single light source 110, as shown in FIG. 4.

Figure 5:
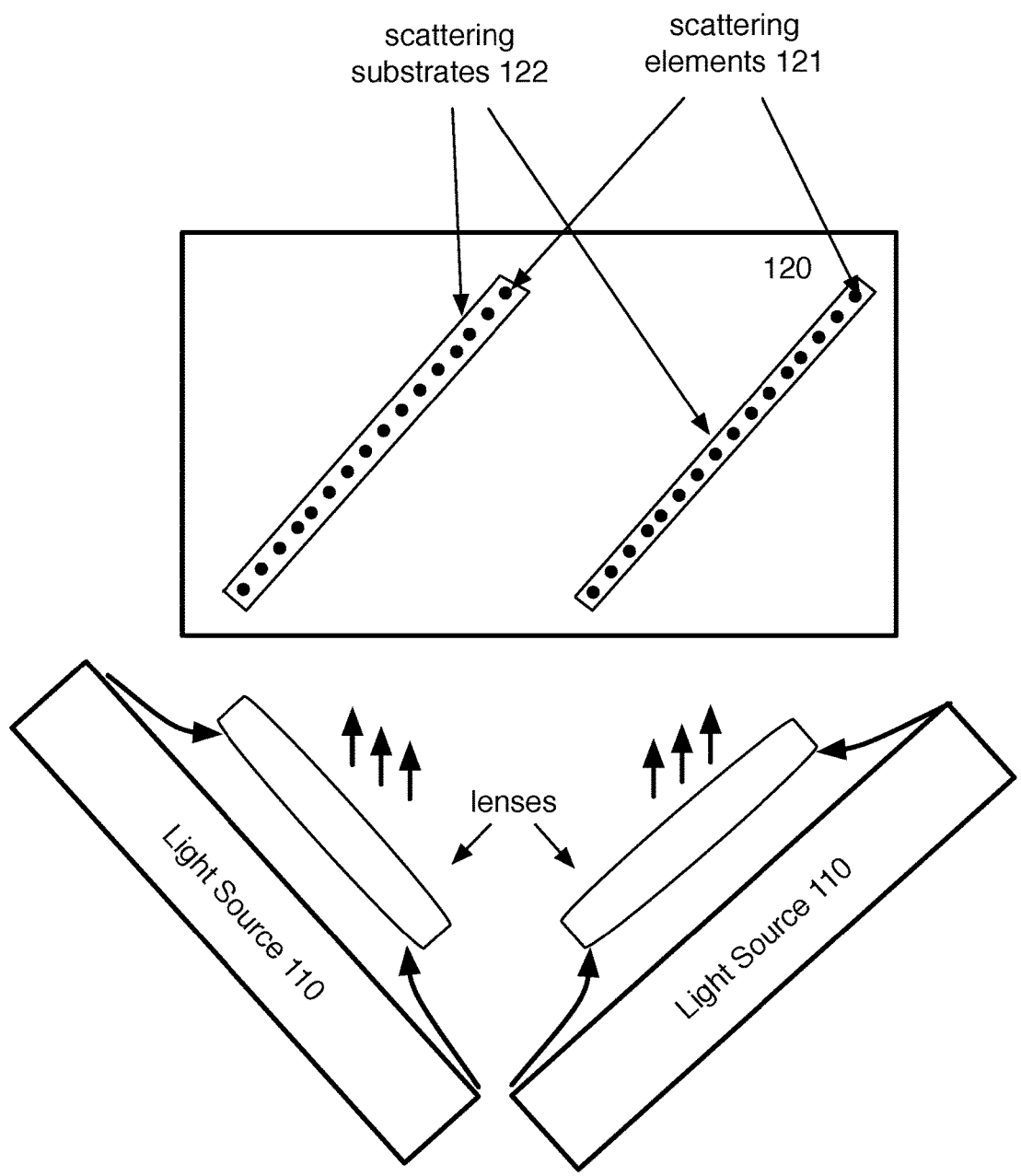
FIG. 5 is a diagram view of a system of an invention embodiment.

In a second implementation of an invention embodiment, slices are transmitted by multiple light sources 110, as shown in FIG. 5. One advantage to a single light source 110 is reduction in cost and complexity; however, resolution is lost when slices are compressed (since the light source 110 has a finite pixel density). The use of multiple light sources 110 and transforming lenses results in a preservation of resolution.

Figure 6:
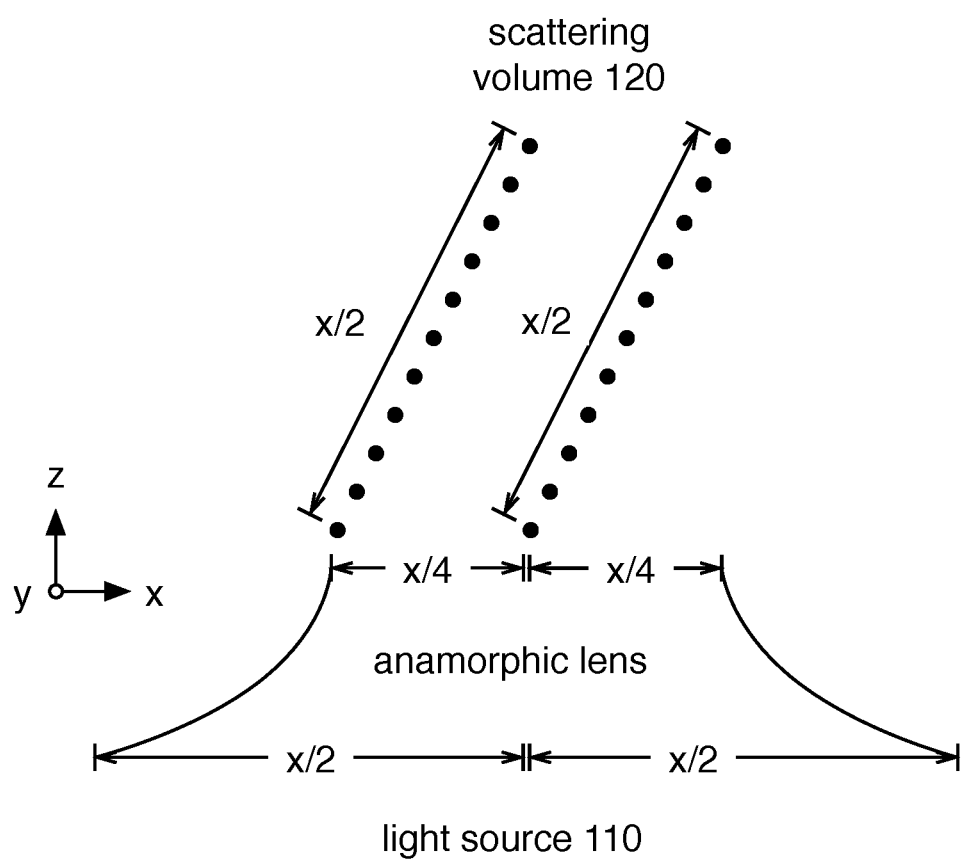
FIG. 6 is a diagram view of a system of an invention embodiment.

In a third implementation of an invention embodiment, an anamorphic lens is used to anisotropically compress the output of the light source 110 (creating a modified aspect ratio), and the scattering volume 120 contains scattering elements 121 arranged such that the original aspect ratio is restored by the scattering volume 120, as shown in FIG. 6. In an example of the third implementation, a light source 110 may have an output image size $x_0 \times y_0$ and an aspect ratio of $x_0:y_0$. An anamorphic lens is used to modify the output image size to $x_1 \times y_1$ and therefore an aspect ratio of $x_1:y_1$. In this example, the modified image size is such that $k(x_1:y_1) = x_0:y_0$; $k<1$ (in other words, the x dimension has been compressed relative to the y dimension). The array of scattering elements 121 of the scattering volume 120 then may have dimensions $x_1 \times y_1 \times z_1$, where $$z_1^2 \approx \Delta^2 \left( \frac{1}{k^2} - 1 \right),$$

thus restoring the original aspect ratio. To show how this follows, one can write $a_1 x_1 \times a_2 y_1 = x_0 \times y_0$;

$$k = \frac{a_1}{a_2}.$$

For the two dimensional representation of a slice with 'thickness' $\Delta$ to restore the original aspect ratio it must be divided by k; i.e., $$\left( \frac{\Delta}{k} \right)^2 = \Delta^2 + z^2 \rightarrow z = \Delta \sqrt{\left( \frac{1}{k} \right)^2 - 1}.$$

In the case where the scattering volume 120 has n slices of equal width, $$z = \frac{x_1}{n} \sqrt{\left( \frac{1}{k} \right)^2 - 1}.$$

In the case where the y dimension is not expanded or compressed (i.e., $a_1 = k$, $a_2 = 1$), $$z = \frac{k}{n} x_0 \sqrt{\left( \frac{1}{k} \right)^2 - 1} = \frac{1}{n} x_0 \sqrt{1 - k^2}.$$

Figure 7:
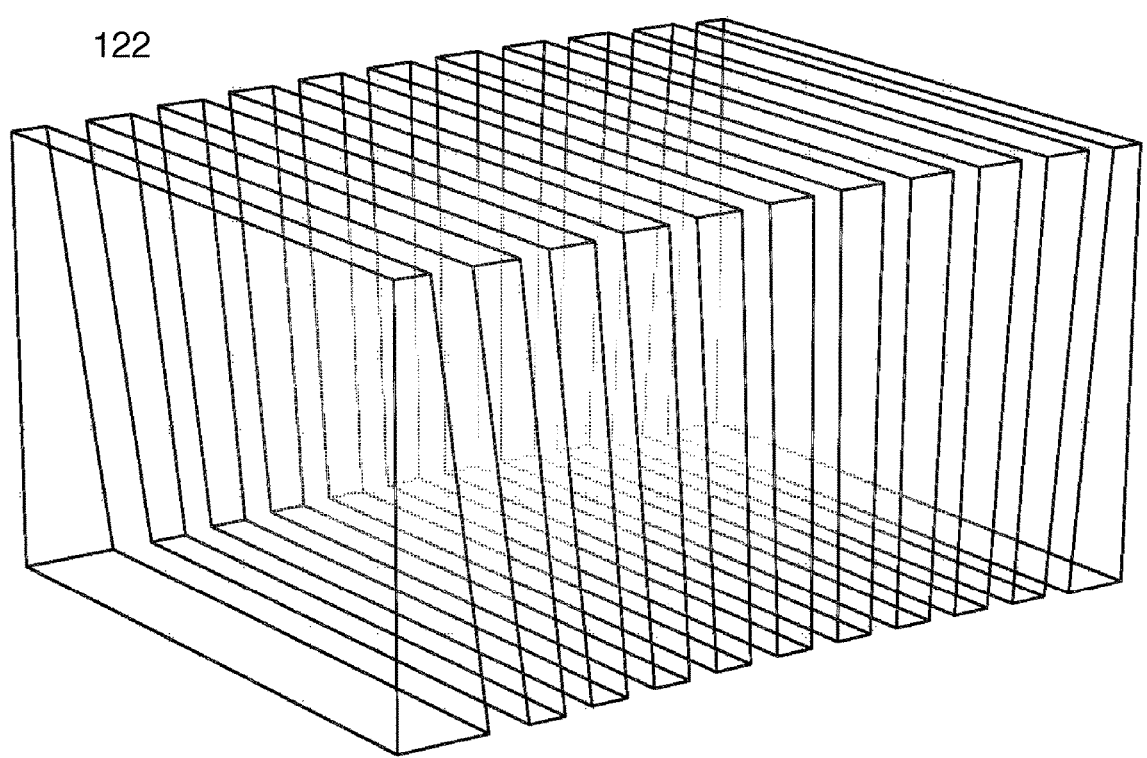
FIG. 7 is an isometric view of scattering substrates of a system of an invention embodiment.

In a fourth implementation of an invention embodiment, the scattering substrates 122 are varying-shape trapezoidal prisms arranged in a varying-tilt configuration and scattering elements 121 are arranged in a rectangular grid pattern on one or both large surfaces of the substrates 122, as shown in FIG. 7. Similar to the previous implementation, in this implementation, images projected by the light source are preferably grouped into image "slices".

The scattering elements 121 may additionally or alternatively be arranged in any manner. For example, scattering elements 121 may be arranged in a random pattern. As another example, scattering elements 121 may be grouped into lines.

Figure 8A:
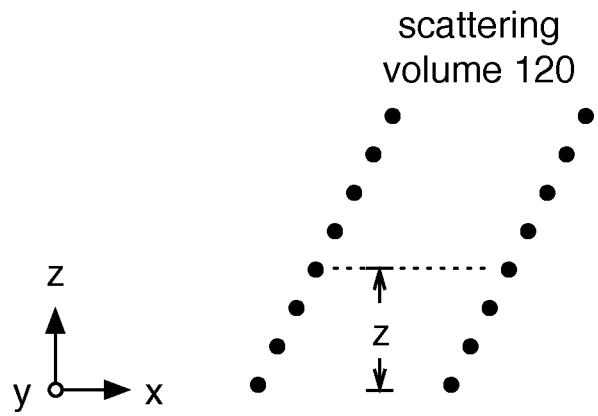
FIG. 8A is a diagram view of non-staggered scattering planes of a system of an invention embodiment.
Figure 8B:
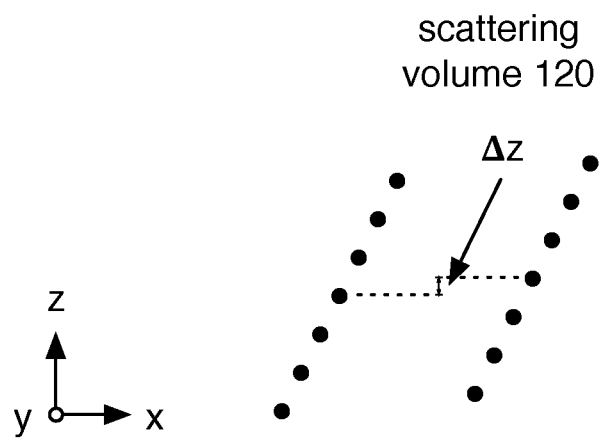
FIG. 8B is a diagram view of staggered scattering planes of a system of an invention embodiment.
Figure 8C:
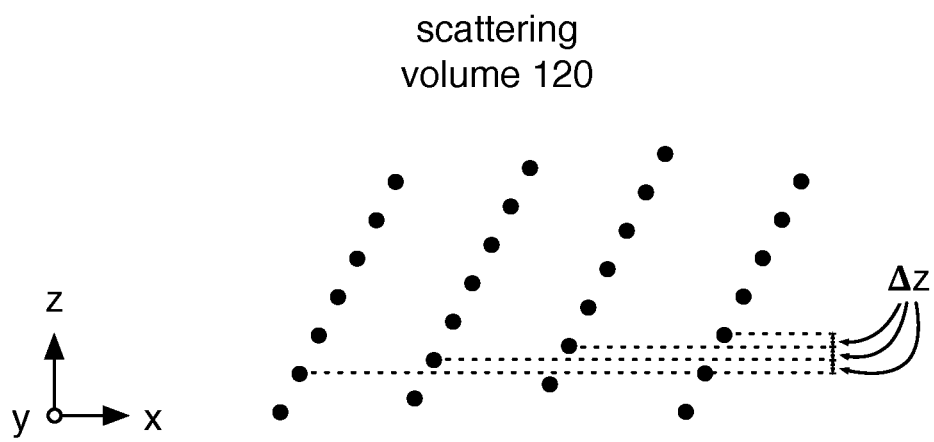
FIG. 8C is a diagram view of periodically staggered scattering planes of a system of an invention embodiment.

The dimensions of the scattering elements 121 are preferably such that the spacing between elements 121 is multiple times larger than the width (or other dimension) of the elements 121; alternatively, the ratio between element 121 dimensions and spacing may be any ratio. For example, in the case where scattering elements 121 are grouped into lines (e.g., parallel to the scattering plane and to each other), the lines may be separated by a distance multiple times (e.g., five) larger than the line thickness. In this case, the distance between elements along a line is preferably less than the distance between lines (e.g., ⅕ the distance between lines). Alternatively, distance between elements within a line may be any value. This may be important for preventing loss of resolution for 'deeper' scattering substrates 122. Further, element 121 arrangement may be staggered (or otherwise varied) across substrates 122. In a non-staggered arrangement, the scattering lines of each scattering plane are positioned at the same height (i.e., Δz=0), as shown in FIG. 8A. In a staggered arrangement, the scattering lines of each scattering plane may be shifted relative to each other (i.e., Δz>0), as shown in FIG. 8B. In a periodically staggered arrangement, as shown in FIG. 8C, each scattering plane is shifted relative to its neighbors, but the shifts repeat periodically.

Likewise, the scattering substrates 122 may be arranged in any manner; e.g., the substrates 122 may be tilted in a conical configuration. An example of a conical configuration includes a set of substrates 122 arranged such that the top edge of the substrates 122 (relative to the axis of projected light) forms a circle around the light axis, as does the bottom edge of the substrates 122, but the circles are different sizes.

The scattering substrates 122 are preferably positioned statically within the scattering volume 120 but may additionally or alternatively be movable (e.g., if the scattering substrates 122 are suspended in a fluid). Additionally or alternatively, the scattering substrates 122 may not be movable, but may be reconfigured (i.e., the scattering properties of the elements 121 or substrates 122 may be changed) due to applied light, electric field, magnetic field, heat, pressure, or any other factor.

For example, scattering elements 121 or substrates 122 may be reconfigured to optimize for different light sources 110, for different displayed scenes, and/or for different ambient light conditions.

Figure 9:
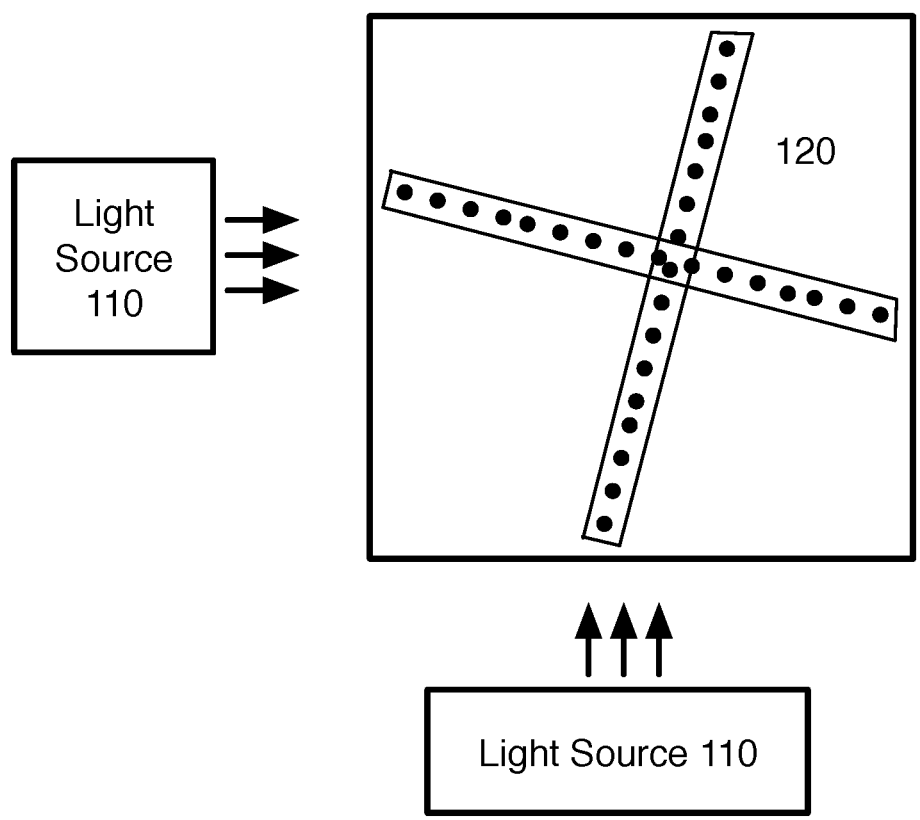
FIG. 9 is a diagram view of scattering substrates of a system of an invention embodiment.

The scattering volume 120 preferably has a single light entry surface (i.e., light from light sources 110 enters only at a single surface), but may additionally or alternatively have multiple light entry surfaces. In instances where the scattering volume 120 includes multiple light entry surfaces (or more generally, for any reason), the scattering volume 120 may include multiple sets of scattering substrates 121 configured to scatter light entering at different surfaces, as shown in FIG. 9.

In one variation of an invention embodiment, the scattering volume 120 includes waveguides (or other optical elements) between a light entry surface and light scattering elements 121.

In a second variation of an invention embodiment, the scattering volume 120 is coupled to a dihedral corner reflective array (DCRA) 122 or a DCRA 122 is otherwise positioned above one or more surfaces of the scattering volume 120.

Figure 10:
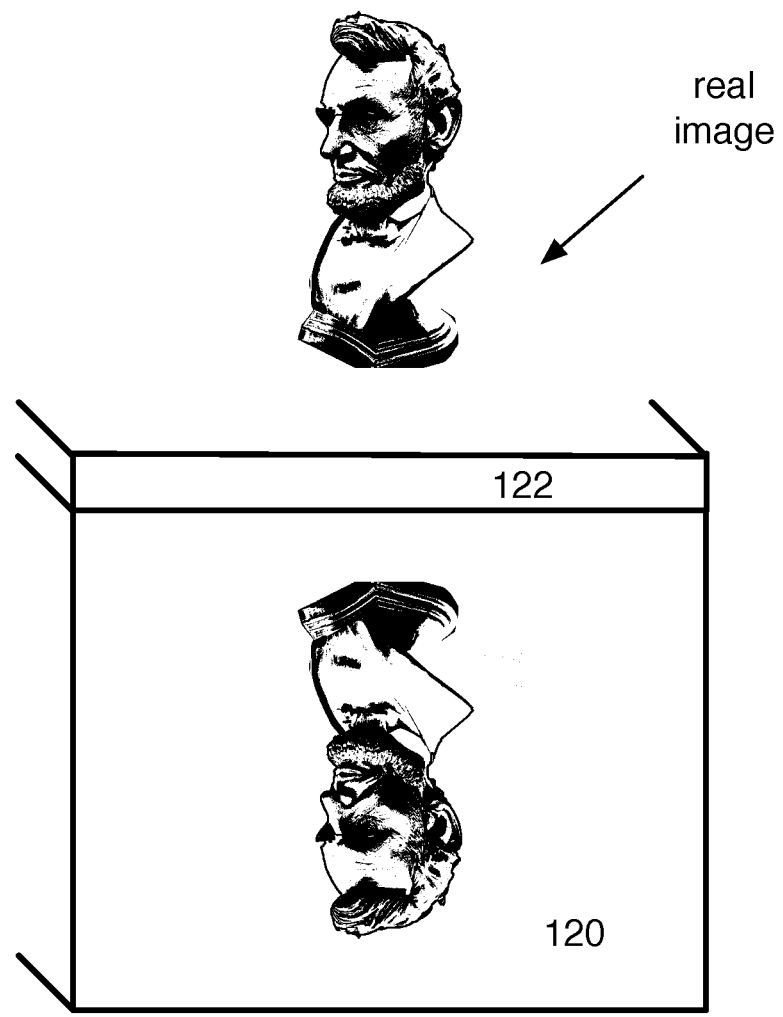
FIG. 10 is a perspective view of a system of a variation of an invention embodiment.

The DCRA 122 preferably functions to generate a real image of the volumetric display 100; that is, the DCRA 122 functions to replicate the image displayed inside the scattering volume 120 in a volume exterior to the scattering volume, as shown in FIG. 10. Additionally or alternatively, the DCRA 122 may function to generate a real image of the volumetric display in any space.

Figure 11:
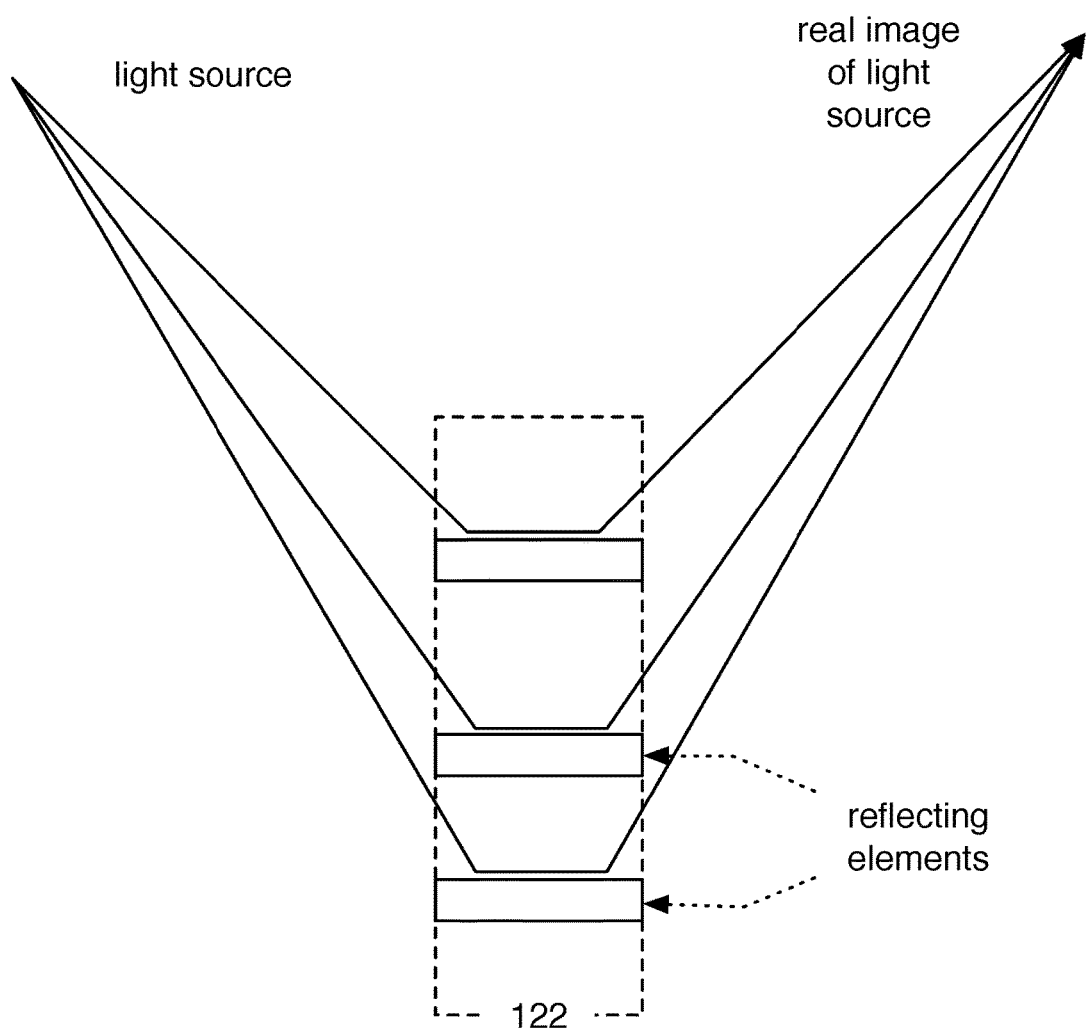
FIG. 11 is a diagram view of a dihedral corner reflecting array (DCRA)

In this variation, the DCRA 122 preferably comprises a two-dimensional array of dihedral corner reflecting elements positioned such that light exiting the scattering volume 120 is able to reflect twice inside the reflecting elements, resulting in the light traveling along a path plane-symmetric to incident path, as shown in FIG. 11.

The DCRA 122 is preferably fabricated by milling, etching, or otherwise creating an array of square through holes in a highly reflective substrate or film (e.g., a metal), but may additionally or alternatively be fabricated by any suitable means. More details surrounding DCRA fabrication and material properties may be found in "Floating volumetric image formation using a dihedral corner reflector array device"[1], the entirety of which is incorporated by this reference.

[1]Daisuke Miyazki et al., 1 Jan. 2013/Vol. 52, No. 1/APPLIED OPTICS

While the DCRA 122 as described in the incorporated reference is a planar (i.e., all of the reflecting elements are contained within a plane), the DCRA 122 of the present invention may be of any shape or orientation. For example, the display 100 may include a DCRA 122 comprising an array of reflecting elements milled from a dome-shaped film instead of a planar one (e.g., a film that approximates a spherical surface). Likewise, while the DCRA 122 preferably includes rectangular prism-based reflectors, the DCRA 122 may additionally or alternatively include any suitable type of reflector capable of reflecting light twice, resulting in a plane-symmetric real image.

Figure 12:
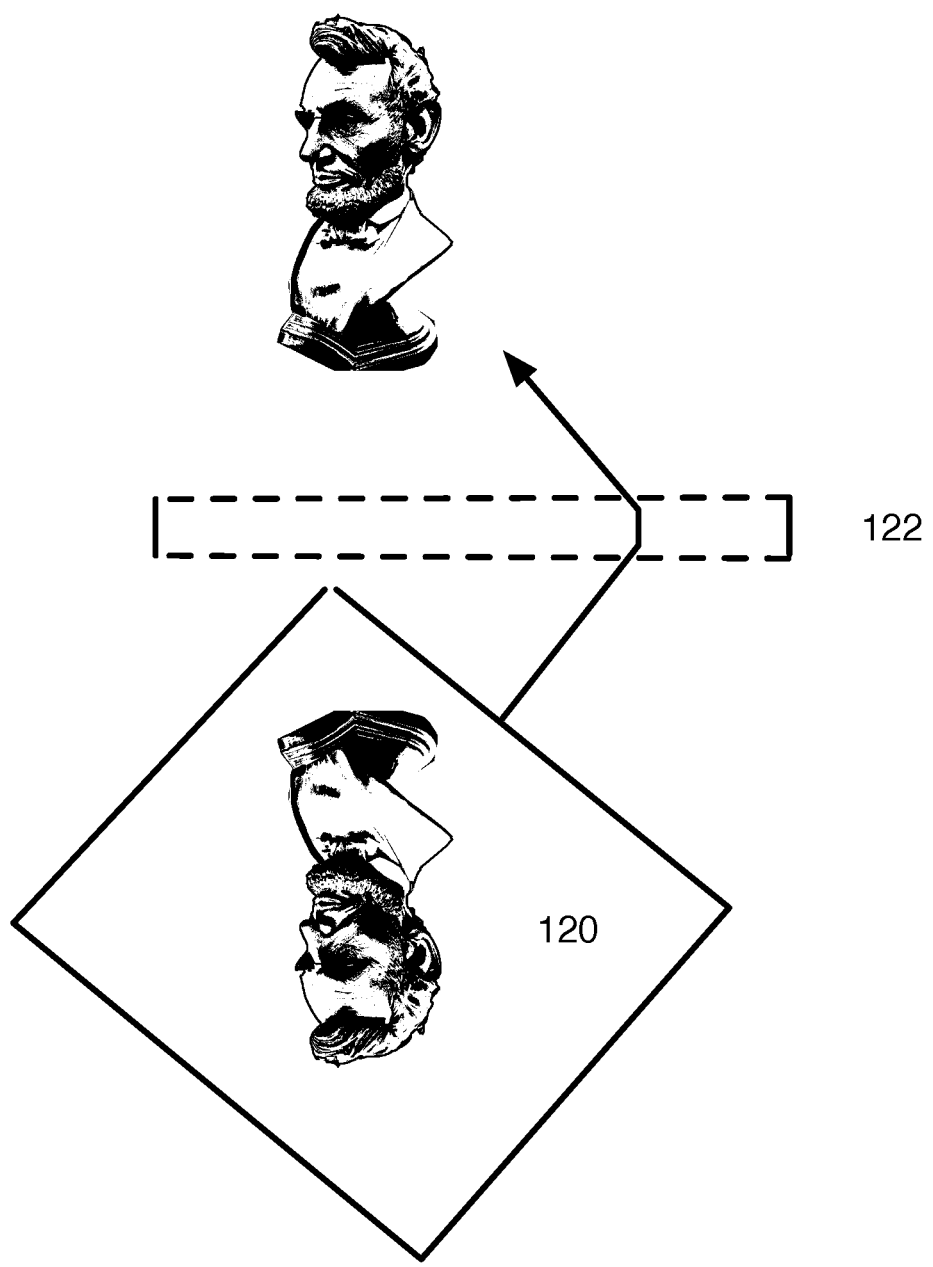
FIG. 12 is an example view of a system of a variation of an invention embodiment.

The DCRA 122 is preferably aligned with the scattering volume 120 such that the majority of light emitted by the volumetric display 100 is accepted by the DCRA 122 (that is, the angle of the light with respect to the DCRA 122 is such that the light contributes to the formation of a plane-symmetric real image), as shown in FIG. 12. Additionally or alternatively, optics (e.g., lenses, mirrors, etc.) may be used in the light path in between the DCRA 122 and the scattering volume 120 to improve or otherwise modify acceptance of light emitted from the scattering volume 120. In one implementation of the variation, the scattering volume 120 preferably includes highly directional light scattering elements 121, and the DCRA 122 is configured to accept the majority of light emitted by the elements 121.

Figure 13A:
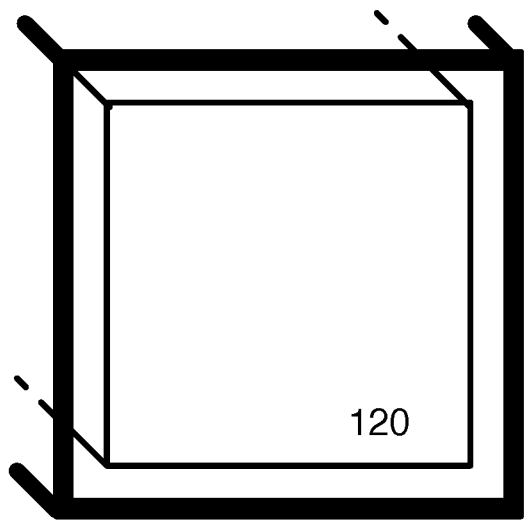
FIG. 13A is a front perspective view of a view restricting shield of a variation of an invention embodiment.
Figure 13B:
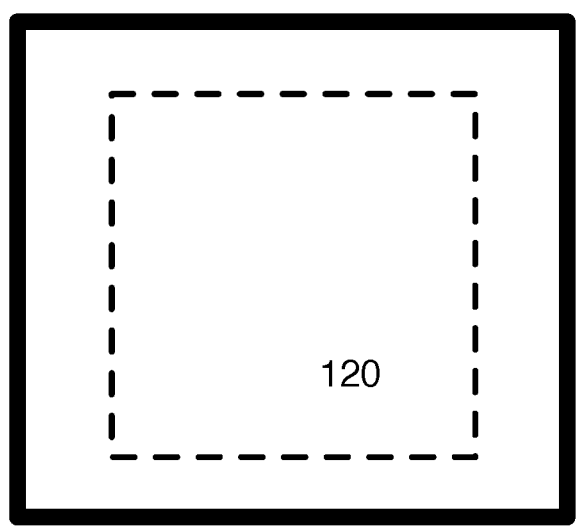
FIG. 13B is a side view of a view restricting shield of a variation of an invention embodiment.

In a second variation of an invention embodiment, the scattering volume 120 includes a filter (e.g., a filter that restricts viewing angle) to reduce the perception of misalignment when the scattering volume 120 is viewed at extreme angles (e.g., >45 degrees from center). Such a filter may be coupled to the scattering volume 120 in any manner (e.g., a privacy film may be applied to the exterior of the volume 120). The volume 120 may alternatively include any elements capable of restricting viewing angle for purposes of preventing perception of misaligned voxels (e.g., filters, concave lenses, other lenses, etc.). For example, the scattering volume 120 may include an opaque or partially opaque shield to restrict viewing angle to reduce the perception of misalignment when the scattering volume 120 is viewed at extreme angles (e.g., >45 degrees from center), as shown in FIG. 13A and FIG. 13B. The shape and structure of the shield may be designed based on the maximum viewing angle desired (e.g., a shield designed to restrict viewing angle to ninety degrees may stick out past the surface of the scattering volume 120 farther than a shield designed to restrict viewing angle to 120 degrees). The shield may have any structure and be fabricated of any suitable material such that viewing of the scattering volume 120 is not substantially impeded within a desired viewing angle, and viewing is impeded (partially or fully) outside of that viewing angle.

The scattering volume 120 is preferably stationary; additionally or alternatively, the scattering volume 120 may move with the light source 110. For example, the scattering volume 120 may be rotated along with the light source 110 quickly to scatter light in multiple desired directions if the light is not scattered in all desired directions while the scattering volume 120 is stationary.

Additionally or alternatively, the scattering volume 120 may be moved relative to the light source 110 (whether the light source 110 is moved or not) to modify the relationship between scattering elements 121 and pixels of the light source no.

If the scattering volume substrate comprises multiple layers (or is otherwise modular), those layers or modular pieces may be moved or otherwise reoriented relative to each other to modify the light scattering properties of the scattering volume 120.

Note that the scattering volume 120 may include optical elements (e.g., mirrors, lenses, waveguides) or other light-altering treatments (e.g., anti-glare surface treatments or layers, viewing angle restriction treatments or layers).

The onboard computer 130 functions to perform image processing for image data received by the display 100 prior to display by the light source no. For example, the onboard computer may separate 3D model information into slices to be projected by the light source no. The onboard computer 130 may additionally or alternatively function to prepare 3D image data for voxel representation in any manner. For example, if light folding is performed by the display 100 (i.e., images are sliced and anisotropically scaled), the onboard computer 130 may perform interpolation between pixel values to determine a new transformed pixel value. As another example, the onboard computer 130 may perform dithering to simulate blurring at image edges.

In the case of a volumetric display where the display involves a series of scattering elements arranged in 'slices' (e.g., the display 100), this image processing involves at a minimum converting the input image data into a series of two dimensional representations (image slices) and projecting those image slices onto the scattering elements 121. Traditionally, such image slices are created by splitting the input image data into a set of spatial partitions (typically along the 'depth' axis) and flattening (or otherwise processing) input image data within each partition into a two-dimensional image, which is then projected on a scattering plane corresponding to that spatial partition. These spatial partitions are preferably unique (i.e., different for each slice) but may be overlapping. Alternatively, spatial partitions may be designated in any manner.

The onboard computer 130 preferably processes input image data into slices based on the unique scattering parameters of a given implementation of the scattering volume 120 (and potentially also based on desired optical properties of the output image, such as viewing cone).

Scattering parameters are preferably parameters that describe the spatial relationship between the scattering elements of the volume 120 and the light source 110. For example, scattering parameters may describe the thickness of each of a set of scattering substrates arranged within the display volume. In another example, scattering parameters can include the orientation angle theta (θ) and relative displacement delta (Δ) of each of the scattering substrates, as shown in FIG. 4 (as well as the location of scattering elements within each substrate). However, scattering parameters can be any other suitable parameters related to how light is scattered by the display volume.

Scattering parameters can additionally or alternatively parameterize the relationship between the light source 110 of the system 100 and the volume 120 in which the three dimensional image is displayed. In particular, scattering parameters preferably include parameters defining the mapping between pixels of the light source and voxels of the display volume. These parameters may be based on the geometric arrangement of the scattering elements of the display, but can alternatively be based on the orientation of the light source or on any other suitable aspect of the display configuration. In some variations, the light source output 110 may be divided into two-dimensional slices, each of which maps to a three dimensional slice (e.g., an image slice), in such cases the scattering parameters may describe the mapping between the two-dimensional and three-dimensional slices.

Scattering parameters may include orientation data describing the relative spacing and position of a set of scattering substrates 122. The scattering substrates can be arranged in a planar configuration, or in any other suitable configuration. In this variation, orientation data preferably includes the linear distance separating each substrate, as well as the angular position of each of the set of substrates relative to the light source 110. The substrates are each preferably separated by the same relative spacing, but alternatively can have any suitable relative spacing (e.g., each substrate may be separated from adjacent substrates by a different relative spacing). Likewise, each substrate preferably has the same angular position relative to the light source 110, but can alternatively have any suitable angular position. This orientation data is preferably used in conjunction with light source no data to determine a relationship between pixels of the light source no and voxels of the display. Scattering parameters can additionally or alternatively be any suitable parameters related to the manner in which light is generated and scattered by the display to form the volumetric image.

Optical properties of the output image are preferably properties related to how the volumetric image can be perceived by a viewer of the display. These can include: opacity, color, hue, saturation, transparency, maximum viewing angle, minimum viewing angle, maximum and/or minimum viewing cone, or any other suitable property of the displayed image.

As previously mentioned, the onboard computer 130 preferably determines the output of the light source 110 based on the received display model, and can additionally or alternatively function to do so according to the received desired optical properties and scattering parameters. Determining image slices of the display model may also be referred to as slicing. Slicing can additionally or alternatively function to compute a collection of 2D planes (e.g., the 2D planes in a volumetric display) that represents the 3D geometry of the display model when displayed.

An image slice as described herein is preferably one of a number of such slices that together make up a volumetric representation of the display model once suitably displayed. Note that an image slice can be considered as the set of voxels constituting a planar section of the displayed volumetric image, or equivalently as the set of pixels of the light source no corresponding to that set of voxels when operating the display. The image slice may additionally or alternatively be considered as the virtual representation (e.g., as stored data) of the image slice. Additionally or alternatively, the image slice can be any suitable real or virtual construct ultimately rendered as a portion of the volumetric image at the display.

The determination of image slices affects the optical properties of the displayed image, such as those discussed above in relation to the desired optical properties. For example, the spacing between image slices (e.g., the physical spacing in the display, the choice of spacing made, etc.) can affect the maximum view angle or view cone of a volumetric 3D image.

The onboard computer 130 preferably performs transformation of input image data into output image slices by splitting input image data (e.g., 3D model) into a set of partitions ('slice regions'). For a slice-based volumetric display, these partitions are preferably along the preferred viewing axis of the display; however, the partitions may additionally or alternatively be made along any axis. Note that creating partitions in the input image data along an axis of the volumetric display requires that the input image data be projected into a spatial representative of the volumetric display, henceforth referred to as the projection space (e.g., if the volumetric display is a cube, where and how the image data is projected ideally within the cube).

The onboard computer 130 preferably determines the slice regions based on the correspondence of this ideal three-dimensional projection within the scattering space to the location of scattering element planes within that space. For example, if a scattering display includes ten scattering element planes, the computer 130 preferably functions to subdivide the projection space into ten slice regions. Note that the size and location of these slice regions is preferably determined by the location and spacing of scattering elements within the volumetric display; for example, if scattering planes are more closely spaced in one region of a volumetric display, the slice regions corresponding to that region (of the projection space) may be smaller (i.e., the distance along the partitioning axis is shorter).

Additionally or alternatively, slice regions may be chosen in any manner. For example, slice regions may be further based on input image content. If, for example, a non-transparent sphere is to be displayed and a viewer is limited in view, it may be desirable to focus on the aspects of the sphere that are intended to be visible (rather than the entire sphere). In this instance, the 'visible projection space' may be subdivided rather than the entire projection space. Note that in this particular example, the onboard computer 130 may perform additional image modification to account for depth discrepancy; that is, if only the visible half of the sphere is displayed, but it is displayed across the entire scattering volume, the input image data must be scaled to account for the stretching along the depth axis that would occur if half of the projection space were displayed across the entire scattering volume naively.

After the slice regions are determined, the onboard computer 130 preferably creates a two-dimensional representation of the three-dimensional image data within each slice region. This is preferably accomplished by 'flattening' the three-dimensional image data onto a two-dimensional plane with respect to the viewing axis (i.e., all x,y,z, data is converted to x,y; if image data occupies the same x and y components, the image data with a z component closer to the front of the display is shown assuming that the image data is non-transparent; if the image data has transparency, it is preferably combined using alpha compositing). Note that if that a composited pixel has α less than one (i.e., not fully opaque), the composited pixel may be displayed as semi-transparent by lowering brightness, altering display duty cycle, or in any other manner. For example, transparency of an image region (as opposed to an individual pixel) may be represented using bitmap techniques. Additionally or alternatively, the onboard computer 130 may transform the three-dimensional image data into two-dimensional slices in any manner.

The onboard computer 130 may additionally or alternatively function to control general properties of the light source 110; for example, the onboard computer 130 may control brightness of light source 110 pixels to simulate changes of opacity in a displayed image.

Additionally or alternatively, if the scattering volume 120 is reconfigurable, the onboard computer 130 may function to provide control information to the scattering volume 120 (e.g., directing the application of electric field to affect scattering properties of metallic nanoparticles, moving scattering substrates 122, etc.).

In one variation of an invention embodiment, the onboard computer 130 may perform multiplexing of 'virtual slices' in order to simulate higher depth resolution. For example, a 3D animation at 60 FPS may be sliced into 12 depth slices; alternating slices of the 12 may be displayed with a scattering volume 120 having only six tilted planes, resulting in a 30 FPS 3D animation (with a simulated depth resolution of 12 slices as opposed to 6).

In another variation of an invention embodiment, the onboard computer 130 may perform attenuation-based light field image synthesis to generate or modify image slice data, as described in "Synthesis for Attenuation-based Light Field and High Dynamic Range Displays"[2], which is incorporated in its entirety by this reference.

[2] Wetzstein, G., Lanman, D., Heidrich, W., Raskar, R. 2011. Layered 3D: Tomographic Image Synthesis for Attenuation-based Light Field and High Dynamic Range Displays. ACM Trans. Graph. 30, 4, Article 95 (July 2011), 11 pages. DOI=10.1145/1964921.1964990 http://doi.acm.org/10.1145/1964921.1964990.

Note that the functions described as performed by the onboard computer 130 may additionally or alternatively be performed by any other computer system (e.g., a distributed computing system in the cloud).

In one implementation of an invention embodiment, the onboard computer 130 is communicative with another electronic device (e.g., a smartphone, a tablet, a laptop computer, a desktop computer, etc.) over a wired and/or wireless communication connection. In this implementation, data may be streamed or otherwise communicated between the onboard computer 130 and the other electronic device. For example, a smartphone may transmit video information to the onboard computer, where it is sliced into depth slices by the onboard computer 130. Additionally or alternatively, depth slicing may be performed by the other electronic device. In general, the task of image processing may be performed and/or split between any number of electronic devices communicative with the onboard computer 130.

The display 100 may also include means for interaction tracking. For example, the display 100 may include a depth camera that tracks user interaction with the display 100, allowing control and/or manipulation of the image displayed based on gestures and/or other interaction between a viewer and the display 100 as measured by the depth camera. As another example, the display 100 may include a transparent touch sensor that tracks viewer touch interactions on surfaces of the scattering volume 120.

In one variation of an invention embodiment, the display 100 may track viewer touch interaction based on changes in light scattering of the scattering volume 120 due to frustrated total internal reflection. This concept is described in more detail in U.S. Provisional Application No. 62/075,736, the entirety of which is incorporated by this reference.

As a person skilled in the art will recognize from the previous detailed description and from the figures and claims, modifications and changes can be made to the invention embodiments of the invention without departing from the scope of this invention defined in the following claims.

What is claimed is:

1. A three-dimensional volumetric display comprising:
a substantially transparent scattering volume comprising a plurality of scattering substrates; wherein the scattering volume contains a three-dimensional array of scattering elements arranged into a plurality of scattering planes tilted relative to the first face of the scattering volume; wherein each scattering substrate comprises a scattering plane; wherein the scattering elements are discontinuous regions comprising ultraviolet-curable polymer ink deposited on surfaces of the scattering substrates; wherein each scattering substrate comprises scattering elements on at least two distinct surfaces;
a light source that generates a two-dimensional image output comprising a set of image slices; wherein the image output is scattered by the scattering volume to create a three-dimensional volumetric image within the scattering volume; wherein each slice of set of image slices is incident upon a unique scattering plane; and
an onboard computer that receives a three-dimensional image dataset, determines a set of slice partitions of the three-dimensional image dataset according to scattering parameters of the scattering volume, and transforms the three-dimensional image dataset into the two-dimensional image output according to the slice partitions; wherein the scattering parameters describe a spatial relationship between the light source and the array of scattering elements.

2. The volumetric display of claim 1, wherein the light source comprises a digital mirror display.

3. The volumetric display of claim 1, wherein the scattering elements are coated with a fluorescent material.

4. The volumetric display of claim 1, wherein each scattering element is formed by halftoned deposition of opaque ink to give an appearance of low-opacity.

5. A three-dimensional volumetric display comprising:
- a light source that generates a two-dimensional image output; and
- a substantially transparent scattering volume, coupled to the light source on a first face of the scattering volume, that scatters the image output of the light source in a direction perpendicular to the light axis of the output of the light source; wherein the scattering volume comprises a plurality of scattering substrates; wherein the scattering volume contains a three-dimensional array of scattering elements arranged into a plurality of scattering planes tilted relative to the first face of the scattering volume; wherein each scattering substrate comprises a scattering plane; wherein the scattering elements are discontinuous regions of low-opacity ink deposited on surfaces of the scattering substrates;

wherein the image output comprises a set of image slices; each image slice of the set corresponding to a unique spatial partition of a three-dimensional image dataset; each image slice of the set projected onto a plane of the plurality of scattering planes; wherein the scattering elements of each scattering planes are arranged into lines; wherein the lines of a same scattering plane are parallel to each other and to the same scattering plane; wherein a spacing between lines is more than five times a spacing of scattering elements within a line.

6. The volumetric display of claim 5, wherein the three-dimensional array of scattering elements is further arranged into voxel groups; wherein each voxel group comprises a plurality of scattering elements; wherein a minimum spacing between voxel groups is more than twice a maximum spacing between scattering elements of a same voxel group.

7. The volumetric display of claim 5, wherein the lines of a first scattering plane are not staggered relative to the lines of a second scattering plane.

8. The volumetric display of claim 5, wherein the lines of a first scattering plane are staggered relative to the lines of a second scattering plane.

9. The volumetric display of claim 5, wherein the scattering planes are periodically scattered.

10. The volumetric display of claim 5, wherein the scattering volume comprises a fluid between the set of scattering substrates.

11. The volumetric display of claim 10, wherein the fluid is index matched to an index of refraction of the scattering substrates.

12. The volumetric display of claim 10, wherein the fluid is not index matched to the scattering substrates; wherein the fluid is a waveguide for light entering the first face of the scattering volume.

13. A three-dimensional volumetric display comprising:
- a light source that generates a two-dimensional image output; and
- a substantially transparent scattering volume, coupled to the light source on a first face of the scattering volume, that scatters the image output of the light source in a direction perpendicular to the light axis of the output of the light source; wherein the scattering volume comprises a plurality of scattering substrates; wherein the scattering volume contains a three-dimensional array of scattering elements arranged into a plurality of scattering planes tilted relative to the first face of the scattering volume; wherein each scattering substrate comprises a scattering plane; wherein the scattering elements are discontinuous regions of low-opacity ink deposited on surfaces of the scattering substrates;

wherein the image output comprises a set of image slices; each image slice of the set corresponding to a unique spatial partition of a three-dimensional image dataset; each image slice of the set projected onto a plane of the plurality of scattering planes; wherein the low-opacity ink is a white-colored ultraviolet-curable polymer.

14. The volumetric display of claim 13, wherein the low-opacity ink is deposited in flat areas of the scattering substrates.

15. The volumetric display of claim 13, wherein the low-opacity ink is deposited in surface cavities of the scattering substrates.

16. The volumetric display of claim 13, wherein the scattering substrates are polymer sheets having a thickness of less than one millimeter.

17. The volumetric display of claim 13, wherein the scattering substrates are varying-shape trapezoidal prisms arranged in a variable-tilt configuration.

18. The volumetric display of claim 17, wherein scattering elements are deposited on at least two surfaces of each scattering substrate.

19. A three-dimensional volumetric display comprising:
- a light source that generates a two-dimensional image output; and
- a substantially transparent scattering volume, coupled to the light source on a first face of the scattering volume, that scatters the image output of the light source in a direction perpendicular to the light axis of the output of the light source; wherein the scattering volume comprises a plurality of scattering substrates; wherein the scattering volume contains a three-dimensional array of scattering elements arranged into a plurality of scattering planes tilted relative to the first face of the scattering volume; wherein each scattering substrate comprises a scattering plane; wherein the scattering elements are discontinuous regions of low-opacity ink deposited on surfaces of the scattering substrates;

wherein the image output comprises a set of image slices; each image slice of the set corresponding to a unique spatial partition of a three-dimensional image dataset; each image slice of the set projected onto a plane of the plurality of scattering planes; further comprising an onboard computer; wherein the onboard computer determines a set of slice partitions of a three-dimensional image dataset according to scattering parameters of the scattering volume and transforms the three-dimensional image dataset into the two-dimensional image output according to the slice partitions; wherein the onboard computer performs multiplexing of virtual slices to simulate a higher depth resolution;

wherein the onboard computer performs multiplexing of virtual slices to simulate a higher depth resolution.

* * * * *